United States Patent
Nakamura et al.

(10) Patent No.: US 7,172,003 B2
(45) Date of Patent: Feb. 6, 2007

(54) RUBBER COMPOSITION FOR TIRE SIDEWALLS AND PNEUMATIC TIRES USING THE SAME

(75) Inventors: Takashi Nakamura, Kobe (JP); Tetsuya Kunisawa, Kobe (JP); Toshiro Matsuo, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 287 days.

(21) Appl. No.: 10/820,035

(22) Filed: Apr. 8, 2004

(65) Prior Publication Data

US 2004/0204532 A1    Oct. 14, 2004

(30) Foreign Application Priority Data

Apr. 10, 2003  (JP) ............................... 2003-106487

(51) Int. Cl.
 *B60C 1/00*  (2006.01)
(52) U.S. Cl. ........................................ 152/525; 524/528
(58) Field of Classification Search ................ 524/528; 152/525
 See application file for complete search history.

(56) References Cited

U.S. PATENT DOCUMENTS 3,773,096 A    11/1973  Masson 6,818,696 B2 * 11/2004  Masson et al. ............. 524/528
2002/0033216 A1    3/2002  Masson et al.

FOREIGN PATENT DOCUMENTS

| EP | 0 906 838 A2 | 4/1999 |
|---|---|---|
| GB | 1120572 | 7/1968 |
| JP | 7-309974 A | 11/1995 |
| JP | 7-309975 A | 11/1995 |
| JP | 9-272307 A | 10/1997 |
| JP | 9-300921 A | 11/1997 |
| JP | 10-195249 A | 7/1998 |
| JP | 10-315717 A | 12/1998 |
| WO | WO 02/081233 A1 | 10/2002 |

* cited by examiner

*Primary Examiner*—Peter D. Mulcahy
(74) *Attorney, Agent, or Firm*—Birch, Stewart, Kolasch & Birch, LLP

(57) ABSTRACT

A lightweight tire with reduced rolling resistance and improved steering stability without decreasing tire durability, said tire containing a sidewall made of a rubber composition including 20 to 70 parts by weight of an inorganic filler, and 5 to 35 parts by weight of polypropylene powder, based on 100 parts by weight of a rubber component, which satisfies the following equation: (amount of polypropylene powder).gtoreq.(amount of inorganic filler+amount of polypropylene powder)/2.

4 Claims, No Drawings

RUBBER COMPOSITION FOR TIRE SIDEWALLS AND PNEUMATIC TIRES USING THE SAME

This Nonprovisional application claims priority under 35 U.S.C. §119(a) on Patent Application Nos. 2003-106487 filed in JAPAN on Apr. 10, 2003, the entire contents of which are hereby incorporated by reference.

BACKGROUND OF THE INVENTION

The present invention relates to a rubber composition used for a sidewall of an automobile tire and a pneumatic tire using the same.

In order to reduce rolling resistance of a tire, a tire can be made lightweight. The conventional method for obtaining a lightweight tire is the method of reducing the amount of rubber that forms the tire. However, durability of the tire is decreased by this method. Also, because a small amount of rubber is used, stiffness of the tire and steering stability tend to decrease. When the amount of the filler in a rubber composition is reduced, rolling resistance can be reduced, but reinforcement properties of the rubber decrease.

It is known that both improvement in fatigue of the rubber and reduced heat generation can be obtained, when a thermoplastic elastomer or an olefin resin is compounded with the rubber component as a reinforcing agent of fiber (see JP-A-7-309974, JP-A-7-309975). It is also known that rubber having high elasticity and high stiffness can be obtained and destruction properties can be improved, by compounding with polyolefins such as polyethylene (see JP-A-9-272307, JP-A-10-315717, JP-A-10-195249). However, in these methods, the kneading temperature of the rubber composition is high and exceeds the melting point of the polyolefin. As a result, dispersion of the compounded polyolefin is insufficient. Consequently, the steering stability is insufficient and a lightweight tire cannot be prepared. In addition, the polyolefin powder is poor in adhesion with the diene rubber which is known to easily become the destruction point.

Also, known is the method of burying a thermoplastic elastomer composition in a sidewall, in order to reduce the road noise of a tire (see JP-A-9-300921). However, according to this method, the rolling resistance cannot be reduced while maintaining the steering stability.

SUMMARY OF THE INVENTION

The present invention aims to obtain a lightweight tire without decreasing durability while reducing rolling resistance and improving steering stability of the tire.

That is, the present invention relates to a rubber composition for a sidewall comprising 20 to 70 parts by weight of an inorganic filler, and 5 to 35 parts by weight of polypropylene powder, based on 100 parts by weight of the rubber component, which satisfies the following equation:

(amount of polypropylene powder)≧(amount of inorganic filler+amount of polypropylene powder)/2.

The particle size of the polypropylene powder is preferably at most 500 μm.

The rubber component preferably contains at most 70 parts by weight of at least one rubber selected from the group consisting of butadiene rubber, isoprene rubber, butyl rubber and halogenated butyl rubber.

The present invention also relates to a pneumatic tire containing the rubber composition for a sidewall.

DETAILED DESCRIPTION

The rubber composition for a sidewall of the present invention contains a rubber component, an inorganic filler and polypropylene powder.

The rubber composition for a sidewall of the present invention contains diene rubber such as natural rubber (NR), butadiene rubber (BR), isoprene rubber (IR), butyl rubber (IIR), halogenated butyl rubber, styrene-butadiene rubber (SBR) and nitrile butadiene rubber (NBR) as a rubber component. The amount of NR in 100 parts of the rubber component is preferably 30 to 100 parts by weight, more preferably 40 to 70 parts by weight. Also, as the rubber component other than NR, 0 to 70 parts by weight of at least one rubber selected from the group consisting of butadiene rubber, isoprene rubber, butyl rubber and halogenated butyl rubber is preferably present. When the amount of the rubber component other NR is more than 70 parts by weight, processability and workability tend to decrease. The rubber component, which is at least one rubber selected from the group consisting of butadiene rubber, isoprene rubber, butyl rubber and halogenated butyl, rubber is preferably contained in the rubber composition for a sidewall of the present invention, in view of the improvement in resistance to flex cracking and crack growth.

The rubber composition for a sidewall of the present invention contains carbon black and/or silica as an inorganic filler. The kind of carbon black is not particularly limited and examples thereof are HAF, ISAF and SAF. Also, the kind of silica is not particularly limited and examples thereof are dry silica (silicic anhydride) and wet silica (hydrous silica). The amount of carbon black and/or silica as the inorganic filler is 20 to 70 parts by weight, preferably 35 to 70 parts by weight, more preferably 40 to 60 parts by weight, based on 100 parts by weight of the rubber component. When the amount of carbon black and/or silica is less than 20 parts by weight, the reinforcement properties decrease significantly and when the amount is more than 70 parts by weight, the rolling resistance becomes poor, which is disadvantageous.

The rubber composition for a sidewall of the present invention contains polypropylene (hereinafter referred to as PP) powder. The PP powder can be a, powder obtained by drying after polymerization or by freezing and pulverizing the powder dried after polymerization. The process for preparing the PP powder is not particularly limited. The amount of the PP powder is 5 to 35 parts by weight, preferably 10 to 20 parts by weight, based on 100 parts by weight of the rubber component. When the amount of PP powder is less than 5 parts by weight, a lightweight tire cannot be achieved and steering stability cannot be improved. When the amount of PP powder is more than 35 parts by weight, the rubber becomes brittle and strength and durability decrease. The PP powder used in the present invention is powder having a small particle size. The particle size of the PP powder is preferably at most 500 .mu.m, more preferably 1 to 300 .mu.m, further preferably 1 to 100 .mu.m. When the particle size of the PP powder is more than 500 .mu.m, the PP powder does not disperse in the rubber and remains as foreign material, decreasing durability, thus being unfavorable. Also, from the viewpoint of high melting point and hardness, the PP powder preferably has high crystallinity.

When mixing the PP powder with the rubber component, the kneading temperature is preferably 110 to 165.degree.

C., more preferably 110 to 160.degree. C. When kneading is conducted at a temperature higher than 165.degree. C., the PP powder melts and phase conversion occurs. As a result, the rubber does not come together and sheet processability tends to decrease. When kneading is conducted at a temperature lower than 110.degree. C., kneading is often insufficient and the dispersion condition becomes poor, thus being undesirable.

The rubber composition for a sidewall of the present invention satisfies the following equation:

(amount of polypropylene powder)≧(amount of inorganic filler+amount of polypropylene powder)/2.

The (amount of polypropylene powder) is preferably 20 to 40% of the (amount of inorganic filler+amount of polypropylene powder). When the (amount of polypropylene powder) is more than ½ of the (amount of inorganic filler+amount of polypropylene powder), rubber hardness decreases and durability tends to become poor.

In the rubber composition for a sidewall of the present invention, process oil (such as paraffin process oil, naphthene process oil and aromatic process oil) can be compounded. The amount of the process oil is preferably 1 to 40 parts by weight, more preferably 1 to 20 parts by weight, based on 100 parts by weight of the rubber component. When the amount of process oil is less than 1 part by weight, processability tends to become poor and when the amount of process oil is more than 40 parts by weight, hardness of the rubber decreases and steering stability tends to become poor.

Furthermore, a silane coupling agent can be compounded together with silica in the rubber composition for a sidewall of the present invention. Also, besides the rubber component, the inorganic filler and PP powder, compounding agents that are usually used in a rubber composition can be compounded accordingly, such as a wax, an antioxidant, stearic acid, zinc oxide, a process oil, a vulcanizing agent and a vulcanization accelerator.

The rubber composition for a sidewall of the present invention is obtained by kneading the rubber component, inorganic filler comprising carbon black and/or silica, PP powder and other compounding agents when necessary, using the usual processing apparatus such as a roll, a banbury mixer and a kneader.

The rubber composition of the present invention can be applied to all applications where a composition of high hardness is required, but is most effective as a sidewall composition for a tire, which is required to have properties such as high hardness and high stiffness in order to maintain durability.

The tire of the present invention is prepared by the usual method using the rubber composition for a sidewall.

The present invention is explained in detail based on Examples below but not limited thereto.

EXAMPLES 1 TO 3 AND COMPARATIVE EXAMPLES 1 TO 3

The components other than sulfur and the vulcanization accelerator were kneaded using a 1.7 L banbury made by Kobe Steel, Ltd. Then, sulfur and the vulcanization accelerator were added to the obtained kneaded article and kneading was conducted with a twin-screw roller. The obtained mixture was vulcanized at 150° C. for 30 minutes to obtain a rubber composition for a sidewall. Each component used in Examples and Comparative Examples is shown in Table 1. The PP powder that was used is H-700 available from Idemitsu Petrochemical Co., Ltd., having a particle size of 70 μm and a melting point of 165° C. In Examples and Comparative Examples, a tire was prepared using PP powder in the sidewall, but the present invention is not limited thereto.

TABLE 1

| | Component |
|---|---|
| Diene Rubber | Natural rubber (RSS #3 grade) |
| | Butadiene rubber |
| | (available from Ube Industries, Ltd.) |
| Carbon Black | N550 |
| | (available from Showa Cabot Co., Ltd.) |
| Process Oil | Diana Process Oil PS32 |
| | (available from Idemitsu Kosan Co., Ltd.) |
| Wax | SUNNOC WAX |
| | (available from Ouchi Shinko Chemical Industrial Co., Ltd.) |
| Antioxidant | SANTOFLEX 13 |
| | (available from FLEXSYS CO.) |
| Stearic Acid | KIRI |
| | (available from NOF Corporation) |
| Zinc Oxide | Zinc Oxide Type 2 |
| | (available from Mitsui Mining and Smelting Co., Ltd.) |
| PP Powder | H-700 |
| | (available from Idemitsu Petrochemical Co., Ltd.) |
| Sulfur | Insoluble Sulfur |
| | (available from Nippon Kanryu Industry Co., Ltd.) |
| Vulcanization Accelerator | Nocceler CZ |
| | (available from Ouchi Shinko Chemical Industrial Co., Ltd.) |

Measurement

Hardness (JIS-A)

Hardness of the prepared rubber composition for a sidewall was measured at 25° C. using a JIS-A hardness meter.

Viscoelasticity

Complex modulus (E*) and loss tangent (tanδ) at 60° C. were measured under a frequency of 10 Hz, initial strain of 10% and dynamic strain of 2% using VES-F-3 made by Iwamoto Corporation. The larger the E* value is the higher the stiffness and the more superior the steering stability. Less heat generation occurs the smaller tanδ value is.

Tensile Test

Tensile test of the prepared rubber composition for a sidewall was conducted according to JIS-K6251 using a type 3 dumbbell and tensile strength at break (TB) and elongation at break (EB) were measured. The larger the obtained number value is the more favorable the rubber strength.

Steering Stability and Riding Comfort

A 195/60R15 size tire was prepared by the usual method and sensory evaluation was conducted on a test course using a normal automobile to which the above tire was mounted.

Lightweight Tire

The weight of the prepared tire was measured under windless conditions using a scale. With consideration to the margin of error, a tire of the same standard was weighed under conditions of N=at least 3 and the average value was assumed to be the tire weight. The value shown in Table 2 demonstrates the degree to which the tire was made lightweight in comparison to the standard tire.

TABLE 2

|  | Ex. 1 | Ex. 2 | Ex. 3 | Com. Ex. 1 | Com. Ex. 2 | Com. Ex. 3 |
| --- | --- | --- | --- | --- | --- | --- |
| Composition (parts by weight) | | | | | | |
| Rubber Component | | | | | | |
| NR | 50 | 50 | 50 | 50 | 50 | 50 |
| BR | 50 | 50 | 50 | 50 | 50 | 50 |
| Carbon Black | 45 | 35 | 25 | 50 | 42.5 | 10 |
| Process Oil | 5 | 5 | 5 | 5 | 5 | 5 |
| Wax | 2 | 2 | 2 | 2 | 2 | 2 |
| Antioxidant | 3 | 3 | 3 | 3 | 3 | 3 |
| Stearic Acid | 2 | 2 | 2 | 2 | 2 | 2 |
| Zinc Oxide | 3 | 3 | 3 | 3 | 3 | 3 |
| PP Powder | 5 | 15 | 25 | 0 | 2.5 | 40 |
| Sulfur | 1.5 | 1.5 | 1.5 | 1.5 | 1.5 | 1.5 |
| Vulcanization Accelerator | 1 | 1 | 1 | 1 | 1 | 1 |
| Test | | | | | | |
| Hs (JIS-A) | 51 | 53 | 55 | 50 | 50 | 60 |
| VES | | | | | | |
| E* (MPa) | 4.5 | 5.2 | 5.7 | 3.7 | 3.9 | 6.2 |
| tan δ (%) | 0.16 | 0.14 | 0.10 | 0.17 | 0.17 | 0.09 |
| Tensile | | | | | | |
| TB (MPa) | 17.8 | 18.6 | 20.1 | 16.6 | 16.8 | 24.3 |
| EB (%) | 488 | 462 | 459 | 635 | 559 | 388 |
| Steering Stability | ◎ | ◎ | ◎ | ○ | ○ | ◎ |
| Riding Comfort | ○ | ○ | ○ | ○ | ○ | Δ |
| Lightweight Tire/g | 38 | 80 | 180 | standard | 15 | 200 |

In Example 1, hardness and the E* value were high and steering stability was improved, in comparison to Comparative Example 1. Also, the obtained tire was lighter. On the other hand, in Comparative Example 2, hardness and the E* value were slightly higher, but the effects of improving steering stability and obtaining a lightweight tire were not achieved. In Comparative Example 3, the rubber strength decreased.

Usually, the specific gravity of polypropylene is at most 1 (0.91). On the other hand, the specific gravity of the rubber is at least 1. By compounding polypropylene powder having a low specific gravity to the rubber composition for a sidewall as in the present invention, a lightweight tire can be obtained.

According to the present invention, a lightweight tire can be obtained without decreasing durability and reduced rolling resistance and improved steering stability of the tire can be achieved.

What is claimed is:

1. A pneumatic tire having a sidewall made of a rubber composition comprising 20 to 70 parts by weight of an inorganic filler, and 5 to 35 parts by weight of polypropylene powder, based on 100 parts by weight of a rubber component; which satisfies the following equation: (amount of polypropylene powder).gtoreq.(amount of inorganic filler+ amount of polypropylene powder)/2.

2. The pneumatic tire of claim 1, wherein the particle size of the polypropylene powder is at most 500 .mu.m.

3. The pneumatic tire of claim 1, wherein said rubber component contains at most 70 parts by weight of at least one rubber selected from the group consisting of butadiene rubber, isoprene rubber, butyl rubber and halogenated butyl rubber.

4. The pneumatic tire of claim 1, wherein the inorganic filler is present in an amount of 40 to 60 parts by weight.

* * * * *